Dec. 25, 1956  E. C. SIMMONS  2,775,102
FREEZING DEVICE
Filed June 15, 1955  2 Sheets-Sheet 1

INVENTOR.
Edward C. Simmons
BY
R. R. Candor
His Attorney

Dec. 25, 1956  E. C. SIMMONS  2,775,102
FREEZING DEVICE

Filed June 15, 1955  2 Sheets-Sheet 2

INVENTOR.
Edward C. Simmons.
BY
R. R. Candor.
His Attorney

United States Patent Office 2,775,102
Patented Dec. 25, 1956

2,775,102

FREEZING DEVICE

Edward C. Simmons, Dayton, Ohio, assignor to General Motors Corporation, Detroit, Mich., a corporation of Delaware Application June 15, 1955, Serial No. 515,613

1 Claim. (Cl. 62—108.5)

This invention relates to freezing devices of the type including a tray and a grid therein for use in household refrigerators in which water is frozen in the device into separated ice blocks for table use.

My invention is specifically related to a type of freezing device constructed substantially in accordance with the ice tray and grid combinations shown in the patents to Donald H. Reeves, No. 2,219,079, dated October 22, 1940, and Richard M. Storer, No. 2,351,303, dated June 13, 1944, assigned to the assignee of the present application. Many thousands of freezing devices of this general type are in use by the public and many more are still being manufactured and sold. Freezing devices of this character include a tray and a unitary grid structure removably disposed therein, which grid has a lever at one end only thereof for raising this one end of the grid together with ice blocks adhering thereto relative to the tray and for thereafter moving substantially inflexible movably interlocked together walls of the grid with respect to one another to release ice blocks from the grid structure. The interlocking connection between a longitudinal wall and intersecting transverse walls of such grid structure is generally accomplished by a web part on the transverse walls fitting in spaced apart, upwardly opening exposed notches provided in the top edge portion of the longitudinal wall or in an upper movable operating member or section thereof. Instructions for harvesting ice blocks from a freezing device of this character are to remove the device with ice blocks frozen therein from the freezing compartment to a refrigerator cabinet and place it on a work ledge or table top, hold the one end of the device down with one hand and raise the lever pivotally mounted on the opposite end of the grid of the device. While this type of freezing device has met with tremendous commercial success, it is not entirely satisfactory and many complaints or objections thereto have been received because of one offense in the act of harvesting ice blocks therefrom. This offense is presented in these devices by the upwardly opening exposed notches and particularly the notch at the end of the grid thereof which is to be held down by the hand of the operator during the act of harvesting ice blocks. The notch at this point, or the notches at these points of the top of the grid is or are exposed and a portion of the operator's hand may enter a notch during manipulation of the grid lever and is pinched or cut while the lever is being raised to move the upper actuating wall section or member of the longitudinal grid wall lengthwise of the lower section or member thereof to tilt the transverse walls of the grid. The offense has been increased by the present-day trend of providing grids with several spaced apart longitudinal walls for making a greater quantity of smaller ice blocks in trays and the plurality of notches at the end of the grid to be held down intensifies the hazard. I, therefore, contemplate the provision of means on a grid of freezing devices of the character just described which will protect the operator's hand to thus eliminate the faultiness thereof.

An object of my invention is to provide an improved freezing device for disposition in a low temperature compartment of a household refrigerator the grid of which can be manipulated to move the walls thereof in an ice block harvesting operation without danger of pinching or cutting a portion of the operator's hand.

Another object of my invention is to provide a grid structure for a tray and grid type freezing device which has an operating lever on one end thereof only with a substantially flat surfaced hold-down pad at its opposite end serving a three-fold purpose.

A further object of my invention is to provide a combined hold-down pad and guard for the top of one end of a movable walled grid structure which can be readily secured to the grid of existing freezing devices to overcome a fault inherently present therein.

A still further and more specific object of my invention is to provide a movable walled grid structure of a freezing device having upwardly opening exposed notches in the top of a wall or walls thereof with a means which serves as a hold-down pad for one end of the grid, a hand protecting guard over at least a notch at the one end of the grid and as an aid in stacking a similar companion freezing device upon and supporting same on top of the present device.

Further objects and advantages of the present invention will be apparent from the following description, reference being had to the accompanying drawings wherein a preferred form of the present invention is clearly shown.

Figure 2:
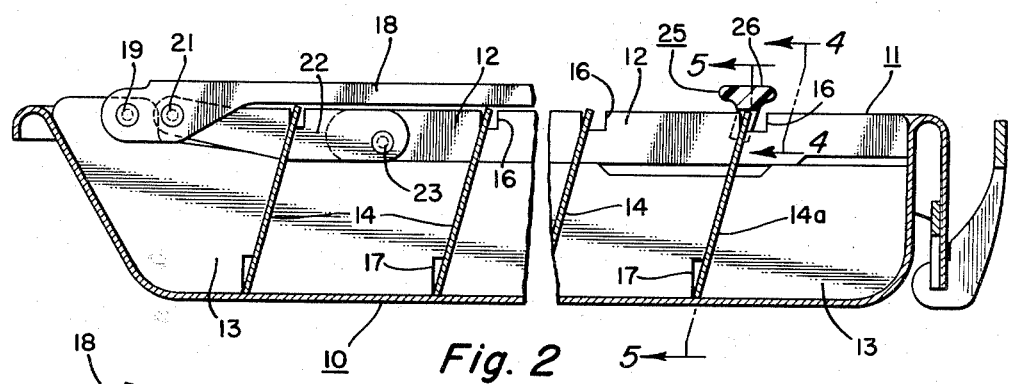
Figure 2 is an enlarged broken sectional view through the device taken on the line 2—2 of Figure 1 showing a grid structure constructed as herein described disposed in a tray.
Figure 1:
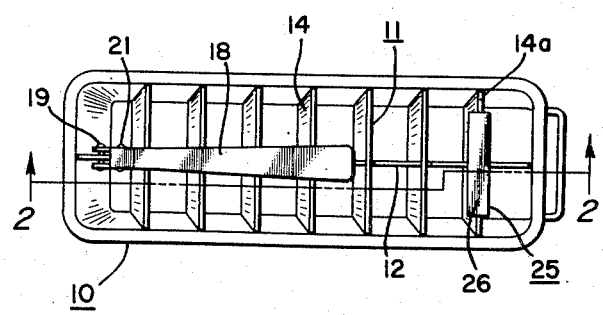
Figure 1 is a top plan view of a freezing device having the present invention embodied therein.

As hereinbefore stated, my invention is directed primarily to tray and grid type freezing devices wherein a wall of a grid structure is provided with upwardly opening exposed notches which present a hazard to operators while manipulating a lever or other force-multiplying means of the grid for moving or tilting certain walls thereof during the act of harvesting ice blocks from the device. Such a freezing device is disclosed in the drawings forming a part of this application and by reference to Fig. 1 thereof it will be noted that the device includes an elongated stamped sheet metal tray 10 having a movable walled unitary grid structure, generally represented by the reference character 11, removably disposed therein for dividing the interior of the tray into a plurality of rows of compartments in which water placed in the device is to be frozen into ice blocks. In Fig. 2, I show the removable unitary grid 11 comprising a two-part longitudinal upright wall formed on two superimposed substantially rigid or inflexible sheet aluminum members 12 and 13. The uppermost member 12 is disposed in the same vertical plane with the lowermost member 13 and a plurality of upright wall members 14, formed of rigid or substantially inflexible sheet aluminum, extend transversely through the plane of the longitudinal wall in spaced apart relation therealong and are movably interlocked therewith. Transverse wall members 14 are normally inclined with respect to the vertical and are adapted to be tilted toward the vertical. Wall members 14 cooperate with the members 12 and 13 of the longitudinal wall and with walls of tray 10 to provide the ice block forming compartments. Provisions are included in the grid structure 11 to move certain wall members thereof relative to or lengthwise of one another and to tilt the transverse wall members from their inclined position toward the vertical to break an ice bond between ice blocks frozen in the device and to release ice blocks from walls of the grid. The transverse wall members 14 have upper and lower web portions fitting or received in upwardly opening, exposed spaced apart notches 16 provided in the upper member 12 of the longitudinal wall and in downwardly opening, spaced apart slots 17 provided in the lower member 13. A lever 18 of a leverage or force-multiplying mechanism at one end of the grid structure 11 is pivotally mounted, by a pin or rivet 19, upon the lowermost member 13 of the longitudinal wall. Lever 18 carries a pin or a rivet 21 to which one end of a pair of links 22 is secured. The other end of the links 22 is secured, by a pin or rivet 23, to an end of the uppermost wall member 12 of the longitudinal grid wall. It will be noted that lever 18 lies longitudinally a substantial distance along the top of the grid and rests upon the upper edges of the transverse walls 14. Lever 18 is disposed above the top edge or rim of the side walls of tray 10 when the grid 11 is positioned in the tray and supported on the bottom thereof, as shown in Fig. 2 of the drawings. The lever 18 is provided with a handle end normally spaced from the top of wall members 12 and 14 to render it accessible by an operator's fingers. The notches 16 are progressively wider with respect to one another from the lever end of the grid to its opposite end. Assembly of grid structure 11 may be accomplished as described in the Reeves patent above identified and its operation may be substantially the same as is described in the patent to F. W. Gerard et al., No. 2,313,932, dated March 16, 1943, also assigned to the assignee of this application.

Figure 5:
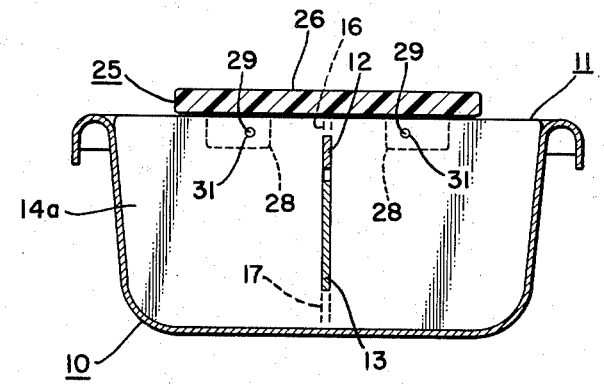
Figure 5 is a sectional view taken on the line 5—5 of Figure 2 showing a transverse wall member of the grid interlocked with a two-part longitudinal wall thereof disclosing the pad and guard above the intersection of the walls.
Figure 4:
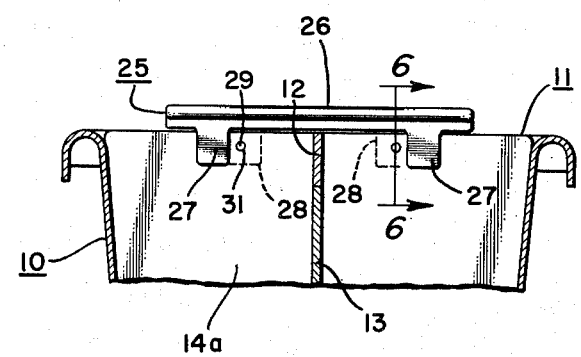
Figure 4 is a fragmentary sectional view taken on the line 4—4 of Figure 2 showing the hold-down pad and hand guard of the present invention secured to the top of a transverse wall of the grid structure.
Figure 6:
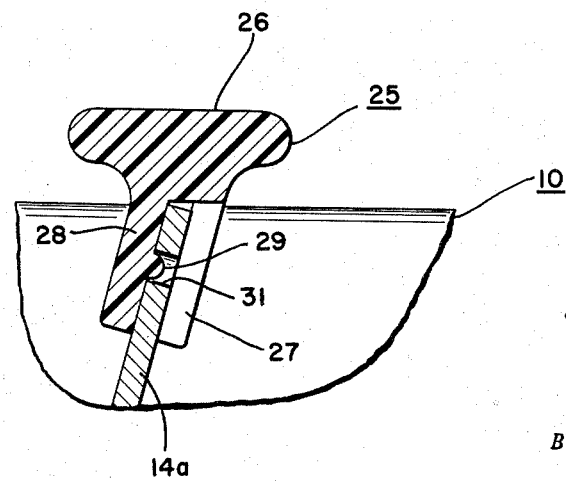
Figure 6 is a fragmentary enlarged sectional view taken on the line 6—6 of Figure 4 showing the attachment of the pad and guard to the top portion of a grid wall.

Since the instructions for harvesting ice from a freezing device of the type disclosed include that of holding the end of the device opposite its lever end down with one hand, while raising and rotating the lever 18 about its pivotal mounting with the other hand, the widest notch 16 in the top of the grid in tray 10 at this opposite end of the device creates the hazard hereinbefore explained. In order to eliminate this hazard or fault in a device of the type disclosed, I provide a guard at the top of grid 11 at the intersection of the longitudinal wall forming members and at least the one end transverse wall 14a opposite the lever end of the grid. This guard is in the form of a one-piece molded plastic element, generally represented by the reference character 25, and preferably extending over both sides of the transverse wall member 14a so as to overlap the widest notch 16 which receives the upper web part of this member 14a. Element 25 is shaped to provide a body portion having a substantially flat top surface 26 and is provided with opposed depending legs 27 and 28 (see Figs. 4 and 6). The two widest legs 28 of element 25 are each provided, on their inner surface, with a small round boss 29 (see Figs. 4, 5 and 6). The end transverse grid wall 14a is provided with two spaced apart round holes 31 adjacent the top edge thereof. In assembling or attaching element 25 to the wall member 14a it is placed over the top of member 14a with the legs 27 and 28 thereof straddling this member and is then forced downwardly therealong. The legs 27 and 28 of plastic element 25 are sufficiently resilient to permit flexing thereof so as to cause the bosses 29 to slide downwardly along the one side of member 14a and be received in the holes 31 whereupon legs 27 and 28 will spring back to their normal position. Element 25 is in this manner locked on the wall 14a and serves a three-fold purpose, as will now be described.

The flat top surface 26 of element 25 is level or disposed in the same horizontal plane with the top of lever 18 and therefore cooperates with this lever to provide a support for stacking a companion freezing device on top of the presently disclosed device in freezing compartments devoid of shelves or ledges for individually supporting a plurality of similar freezing devices. The element 25 provides or forms a blunt hold-down pad for the freezing device which serves to avoid the necessity of an operator's hand engaging sharp or piercing edges of walls of a grid structure when the lever 18 is to be raised and rotated about its pivotal mounting. Element 25 also forms or provides the grid structure 11 with a protective guard over the notch 16 above end transverse wall member 14a which shields and prevents a portion of an operator's hand entering the notch during the act of raising or actuating lever 18 to move a side of the notches 16 into engagement with the upper web portion of the transverse walls 14 for tilting them.

Figure 3:
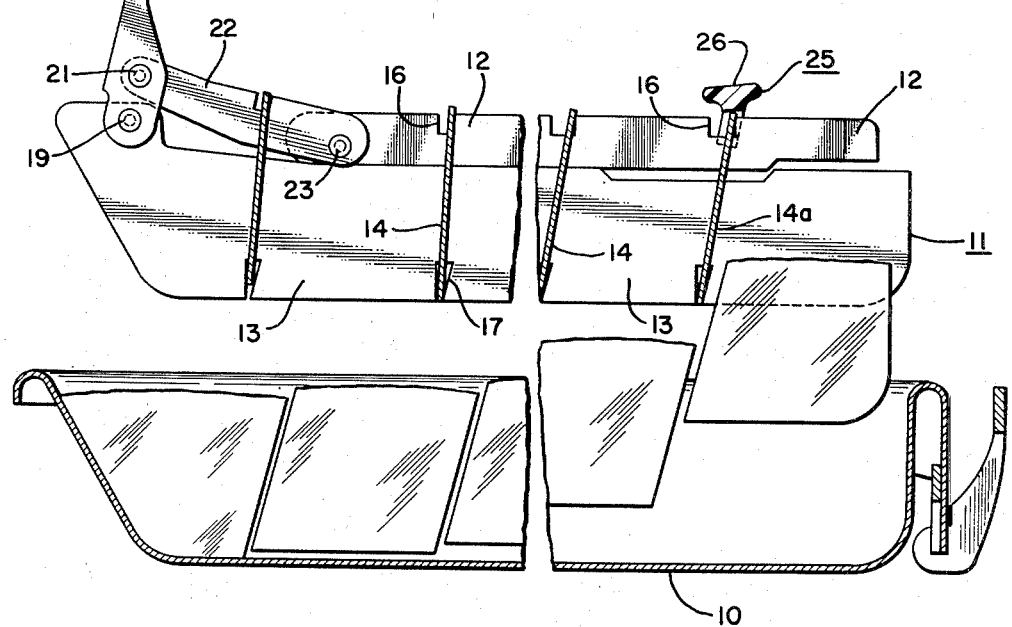
Figure 3 is a view disclosing the grid removed from the tray of the device and showing the position of walls of the grid after they have been moved to release ice blocks therefrom.

In operating the present device with my improvement incorporated therein to harvest ice blocks therefrom after it has been removed from a freezing compartment of a refrigerator cabinet with ice blocks frozen therein, the device is placed on a flat work-table or table top. The operator or housewife places one hand on the end of the freezing device opposite the lever end thereof and grasps the handle portion of lever 18. The operator's one hand rests on the pad 25 to hold the one end of tray 10 and grid 11 down, while grasping the handle portion of lever 18 and applying upward force thereto by the other hand. This can be done with assurance that the operator's hand will not be pinched or cut upon further manipulation of lever 18. Force applied to lever 18 raises or elevates same about its pivotal mounting on grid 11 and this force is transmitted through the links 22 first to the one end transverse wall 14, at the lever end of the grid, to tilt same from its acute angle relative to a line extended perpendicular to the longitudinal extension of the grid toward the vertical. This forces the two ice blocks at the lever end of the device to be cammed against the inclined end wall of tray 10 whereupon they are loosened from walls of the grid and tray and simultaneously ride upwardly along this inclined wall to elevate the lever end of the grid relative to tray 10 to break all other ice blocks loose from walls of the tray. The construction and interlocking arrangement of the transverse wall members 14 in the notches 16 of member 12 of the longitudinal grid wall are such that the upper member 12 does not move lengthwise relative to member 13 while the grid structure 11 and other ice blocks bonded thereto are being elevated angularly within tray 10. The wedging of the two ice blocks against the inclined end wall of tray 10 is not herein illustrated for the reason that it has now become standard practice and is shown and fully described in the Gerard patent hereinbefore referred to. Continued or further rotary movement of lever 18 then causes the links 22 to apply a lengthwise movement to the uppermost member 12 of the longitudinal grid wall relative to the lowermost member 13 thereof. This further rotary movement of lever 18 shifts the member 12 lengthwise or to the left of member 13, as viewed in the drawings, and causes the one or right-hand side wall of notches 16 to progressively engage the transverse walls 14 and tilt them toward the vertical in succession from end to end of the grid structure to enlarge the ice block compartments and loosen all other of the ice blocks from walls of the grid structure, while the grid remains in the tray. It will be noted by reference to Figs. 2 and 3 of the drawings that the right-hand side wall of notch 16 receiving the web portion of the one transverse end wall 14a has been shifted to engage and tilt this wall. If it were not for element 25 overlapping and protecting the space between the right-hand side wall of the notch and the upper part of wall 14a, portions of the operator's hand might enter this space and be pinched or cut by such shifting of the notch while holding the one end of the grid down in the tray during operation of lever 18. Grid structure 11 is then raised straight upward relative to tray 10, as shown in Fig. 3 of the present drawings, and the loosened ice blocks slide out of same and are received in tray 10 from which they may be individually harvested.

As before stated, there are thousands of freezing devices of the type herein disclosed in use today by the public and operated or actuated as just described. My invention is applicable to the many grids of freezing devices presently in use in homes as well as to the ones now being manufactured and sold. For example, all that is necessary to apply my hold-down pad element 25 to existing grid structures is for a serviceman to drill the two holes 31 in the end transverse wall 14a of a customer's or user's grid or grids and to snap the element 25 in place on this wall, as previously described herein. This grid wall, being formed of sheet aluminum, will not cause the user any trouble by the drilling of the holes therein, from the corrosion or rusting standpoint. Thus, my invention not only eliminates objections to presently manufactured grids for freezing devices but can also correct a fault in those previously manufactured and now in use, with very little expenditure of time and cost.

From the foregoing, it should be apparent that I have provided an improved freezing device for use with household refrigerators. My improvement, in addition to providing a blunt hold-down pad at the top of one end of a freezing device and of forming a guard which protects an operator's hand from being pinched or cut by moving or shifting operations of a grid of a freezing device during an ice block harvesting operation, also provides means on the device whereby similar companion devices can be stacked one upon another. My improvement is not limited to incorporation thereof in a newly manufactured grid since it can be readily applied to those now in service to overcome a fault or objection inherently present in the type of grid herein disclosed. The use of my guard and hold-down pad becomes more important in grid structures wherein two or more longitudinal walls are present.

It is well known that most molded plastic articles, when refrigerated to a low temperature and touched by a person's hand, do not create the sensation of being as cold as they really are because such materials are incapable of withdrawing heat from the hand as rapidly as does metal. Thus, a further advantage is gained from the combined holddown pad and guard element of my invention in that it eliminates a complaint frequently expressed by housewives of their hand becoming "frozen" or sticking to metal walls of a grid structure while holding one end of a grid down in a tray during the act of operating a lever on the other end of the grid.

While the form of embodiment of the invention as herein disclosed constitutes a preferred form, it is to be understood that other forms might be adopted, as may come within the scope of the claim which follows.

What is claimed is as follows:

In combination, a tray having a unitary grid structure removably disposed therein, said grid structure including a longitudinal wall formed of two superimposed members disposed in the same plane with one another and a plurality of wall members extending transversely thereacross in spaced apart relation dividing the interior of said tray into compartments in which water is to be frozen into ice blocks, said transverse grid wall members being normally inclined with respect to the vertical, means for interlocking said transverse wall members to said longitudinal wall for tilting movement relative thereto, said means including spaced apart upwardly opening exposed notches in the uppermost member of said longitudinal wall each receiving a portion of one of said transverse wall members, a single lever pivotally mounted upon one end of said grid structure for moving said uppermost member of said longitudinal wall lengthwise relative to the lowermost of said superimposed members thereof to elevate said one end of the grid and ice blocks adhering thereto with respect to said tray, a side of said upwardly opening notches normally being spaced from said transverse wall members and adapted, when said uppermost member is so moved relative to said lowermost member, to engage and tilt said transverse wall members toward the vertical for releasing ice blocks from the grid structure, means at the top of one of said grid wall members having a portion projecting laterally out of the inclined plane thereof horizontally over said side of the notch at the end of said grid structure opposite its said one end, and said horizontally projecting portion of said means being wider than the thickness of said one grid wall member whereby a substantially flat smooth hold-down pad is provided at the end of said grid structure opposite the lever end thereof.

References Cited in the file of this patent
UNITED STATES PATENTS

| | | |
|---|---|---|
| 2,099,282 | Smith | Nov. 16, 1937 |
| 2,265,705 | Steenstrup | Dec. 9, 1941 |
| 2,297,558 | Hintze | Sept. 29, 1942 |
| 2,587,233 | Schweller | Feb. 26, 1952 |
| 2,642,726 | Frei | June 23, 1953 |
| 2,642,727 | Frei | June 23, 1953 |